April 18, 1967  F. J. STYES  3,314,166
EDUCATIONAL DEVICE
Filed April 27, 1964  4 Sheets-Sheet 1

INVENTOR.
Fred J. Styes.
BY
Barnes, Dickey & Pierce
ATTORNEYS

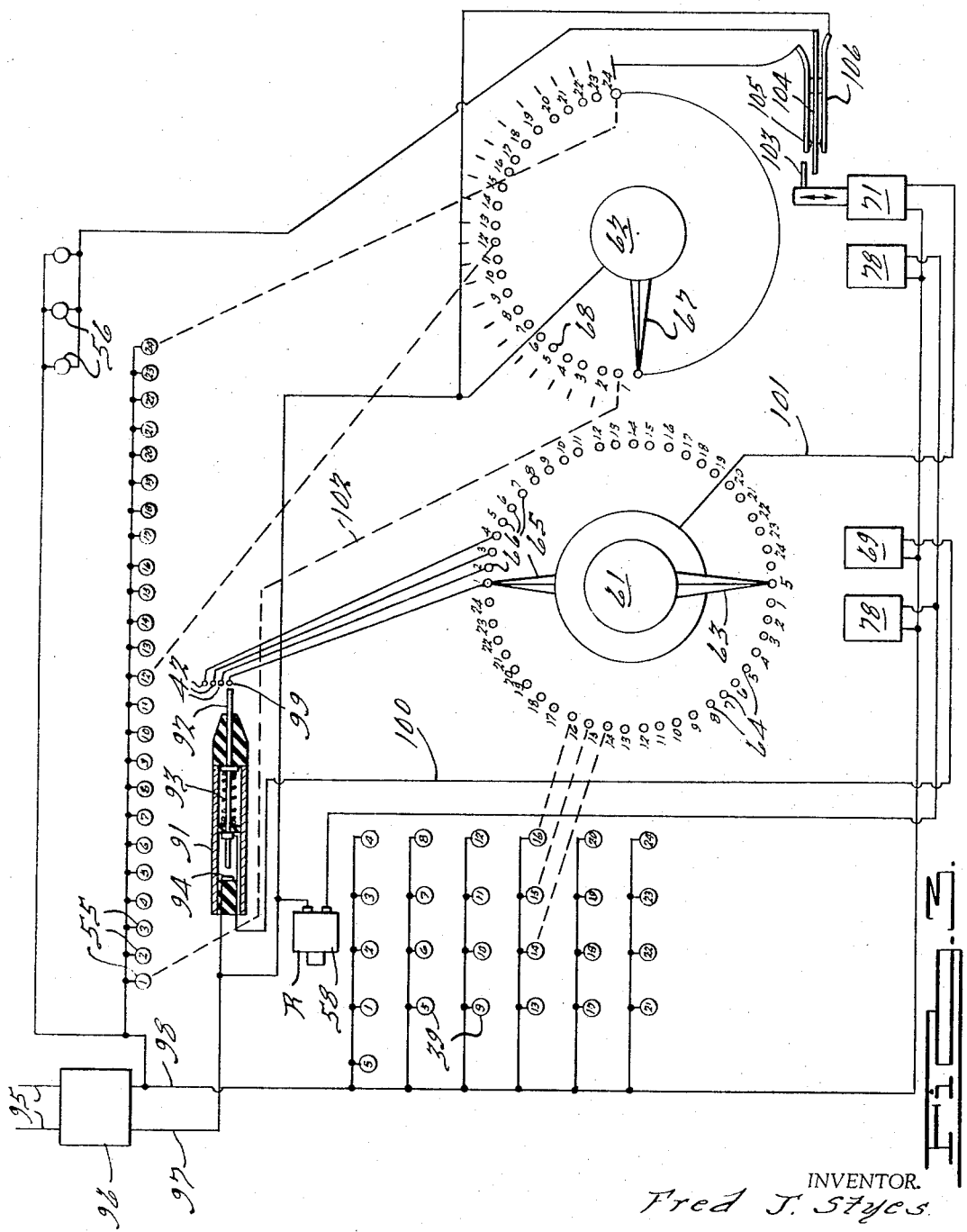

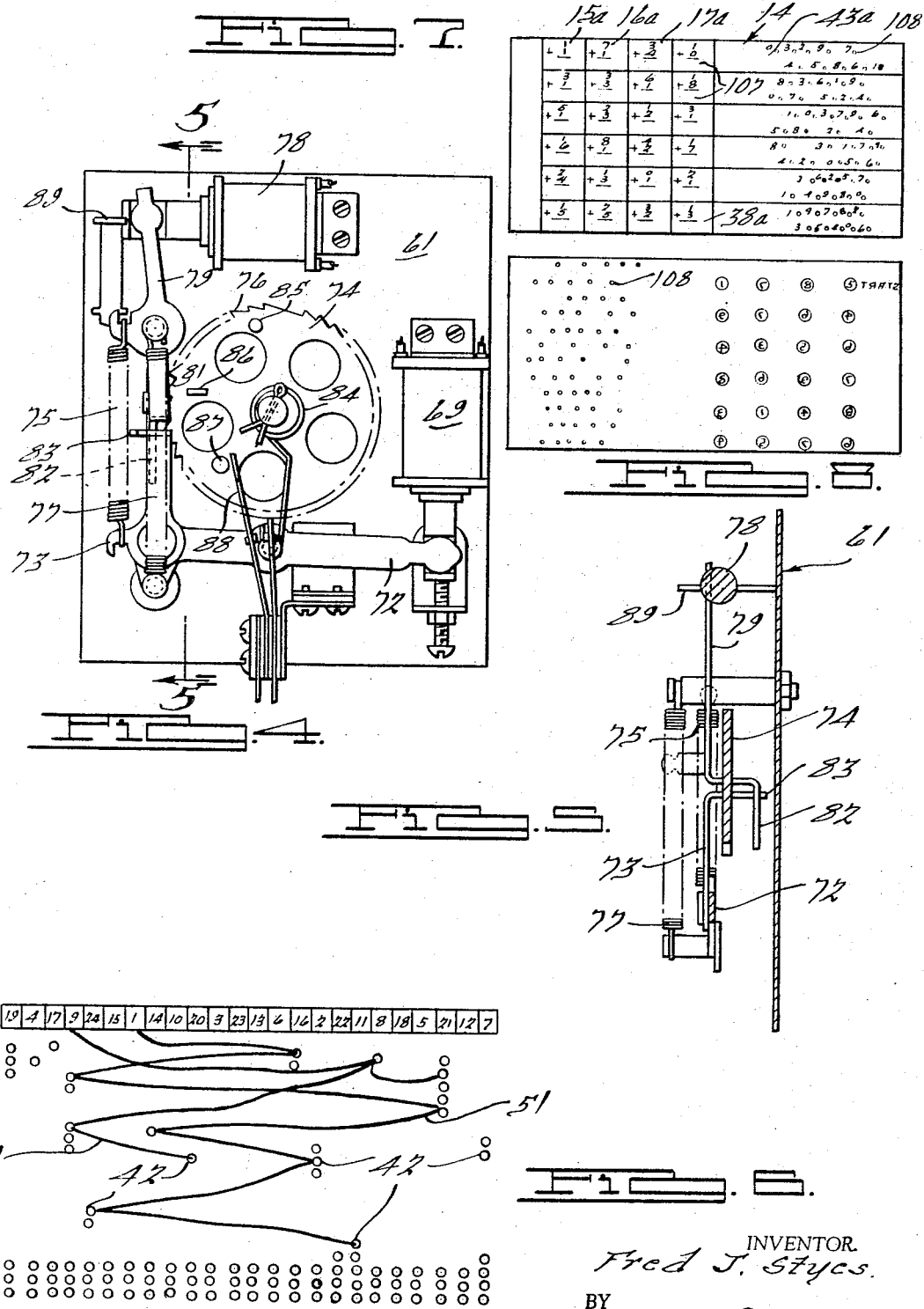

April 18, 1967  F. J. STYES  3,314,166
EDUCATIONAL DEVICE
Filed April 27, 1964  4 Sheets-Sheet 4
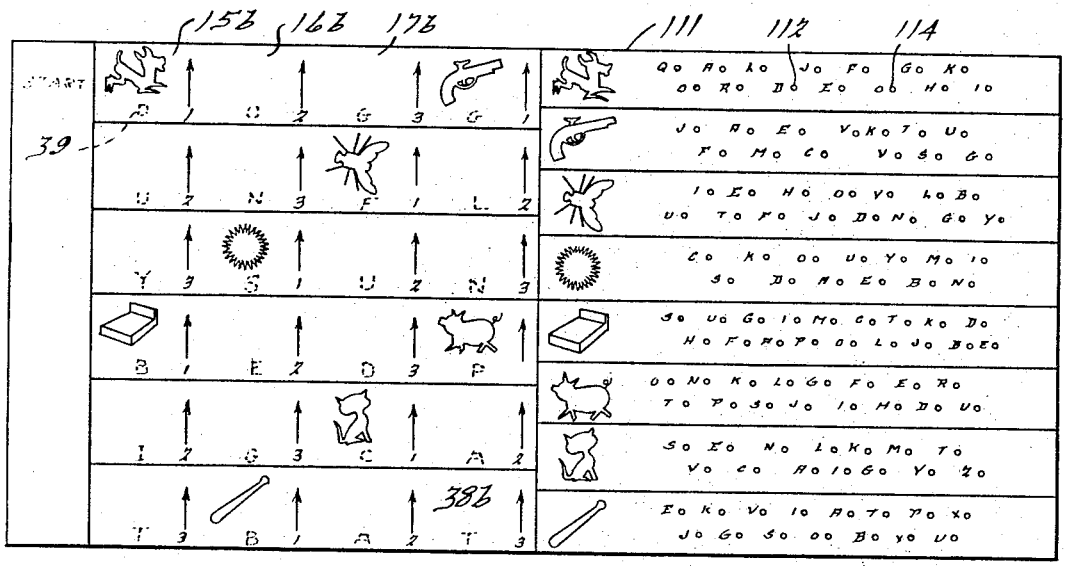
FIG. 9.
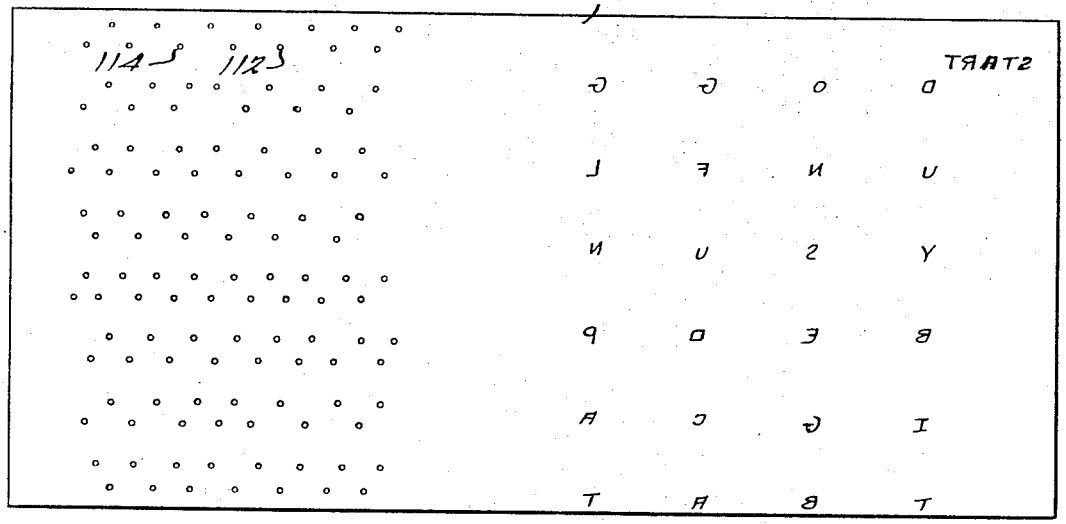
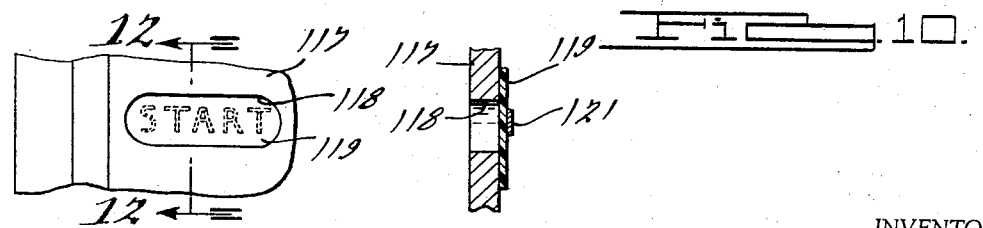
FIG. 10.   FIG. 11.   FIG. 12.
INVENTOR.
Fred J. Styes.
BY
Carnuso, Dickey & Pieru
ATTORNEYS sing elements employed in the device of FIG. 1;

United States Patent Office 3,314,166
Patented Apr. 18, 1967

3,314,166
EDUCATIONAL DEVICE
Fred J. Styes, W. U.S. 2, Saint Ignace, Mich. 49781
Filed Apr. 27, 1964, Ser. No. 362,577
14 Claims. (Cl. 35—9)

This invention relates to educational devices and particularly to a device which checks a person's knowledge by selecting one of a plurality of answers provided for each question.

Many educational devices have been developed in the art for checking and teaching children arithmetic, spelling, coordination, reasoning and like problems. The present invention is a somewhat similar device which can handle questions and answers on many subjects such as arithmetic, spelling, geography and the like.

The device embodies a case which is divided into a plurality of areas for questions with a light associated with each area to indicate the correct answer to the question. An extension to a row of question areas contains a large number of contacts, some of which are in a circuit with a correct answer indicating device. A row of lights equal to the number of questions are energized seriatim each time the correct contact is selected for the question. The light informs the child that the correct answer was selected. If the answer was not correct, the next light in the series will not become energized and the number of correct answers will thereby be indicated. In this arrangement the correct answer will be given whether or not the correct contact was engaged. Further, the case has one or more additional lamps located behind a transparent closure bearing a word such as "correct," "perfect," or the like, which also becomes illuminated at the time the light of the series was illuminated to further indicate that a correct answer had been selected.

A large number of cards bearing questions and answers are furnished with the device having areas which mate with the question areas of the case with a space below the problem which becomes illuminated by the light located thereat to show the correct answer through the card material, the answers being reversed so that they can be correctly read from the opposite side when illuminated. If for example, in the first square at the top of the card, 1 and 1 are to be added, the person selects a number answer and inserts a probe through a hole adjacent to the number to engage an uncovered contact which lights in the first question area and illuminates the answer "2" through the card whether or not the proper contact was engaged. If the proper contact was engaged, then the first lamp of the series of correct answers will be lighted as well as the word "correct" so that not only will the answer be given but the child will be shown that his selection of the answer was a correct one. A series of numbers, 0 to 9 are located on the card opposite to the row of problem areas above the large number of contacts, ten of which will be exposed by the holes through the card located adjacent to the numbers. If the person is aware of the fact that 1 and 1 equal 2 in the problem of addition, he selects the number "2" and inserts the probe through the hole in the card adjacent thereto and the correct solution will be indicated.

When all the problems are answered and scored, another card can replace the one used theretofore. Such a card may have three letter pictures thereon, the first picture could be a dog with two blank areas, the next picture could be a pistol with two blank areas and so on. If the person knows how to spell dog, he will first select D from the series of letters and place the probe in the hole adjacent thereto. This will illuminate a D below the picture of the dog. The first correct answer lamp and the word "correct" will be illuminated showing the correct selection of the first letter. The person next selects the letter O and the lamp in the second area is illuminated showing the letter O through the card material. The second correct answer lamp and the word "correct" are also illuminated. When, if selecting the next letter, the letter G was probed, the third area would be illuminated to show the letter G, the third correct answer lamp and the word "correct" will be illuminated. If a wrong contact is probed, only the answer is illuminated and one error would be noted by the failure to illuminate the next correct answer lamp of the series. The mechanism is so arranged that when changing from one card to another or when completing a card, a switch may be operated to return all of the contacts to their original position.

The probe has a conducting point which when placed upon the proper contact completes a circuit to mechanisms which advance contacts by steps to control the circuits to the correct answer lamps and to the lamps which illuminate the word "correct." The probe carries a contact which completes a circuit to light the lamp in the question area which, when illuminated, shows the answer on the card beneath the question. Solenoids actuate fingers for advancing ratchet wheels one notch at a time to advance the contacts by steps to produce the sequence of lighting pointed out hereinabove. After answering all of the questions, a switch may then be actuated to return all of the contacts to their original positions with a lamp lighted to indicate the device is ready to be operated by the illumination of the word "start" from the back of the card.

Accordingly, the main objects of the invention are: to provide an educational device having questions which can be answered by the use of a conducting probe and the answer shown whether or not it was selected correctly; to provide a plurality of different cards having different questions thereon with a plurality of answers which are checked by a probe to ascertain whether or not the correct answer was selected; to provide a device having a question and answer card thereon which indicates the correct answer, whether or not the correct answer was selected and which scores the correct answers; to provide a question and answer device with indicating means which shows the number of correct answers which have been selected to indicate the score which the person had made, and in general, to provide a device for teaching and checking a person on his knowledge of different subjects which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 3 is a diagrammatical view of the circuits and switching elements employed in the device of FIG. 1;

FIG. 4 is a plan view of the operating mechanism for one of the contact devices illustrated in FIG. 3;

FIG. 5 is a sectional view of the structure illustrated in FIG. 4, taken on the line 5—5 thereof;

FIG. 6 is a schematic view of wires joined to contacts which are to be selected by the probe for answering the questions correctly;

FIG. 7 is a front view of a sheet containing questions and answers employed with the device illustrated in FIG. 1;

FIG. 8 is a rear view of the sheet illustrated in FIG. 7;

FIG. 9 is an enlarged front view of a sheet having picture spelling questions thereon;

FIG. 10 is a rear view of the sheet illustrated in FIG. 9;

FIG. 11 is an enlarged broken view of a sheet having the word "start" thereof, and FIG. 12 is a sectional view of the card illustrated in FIG. 11, taken on the line 12—12 thereof.

Figure 1:
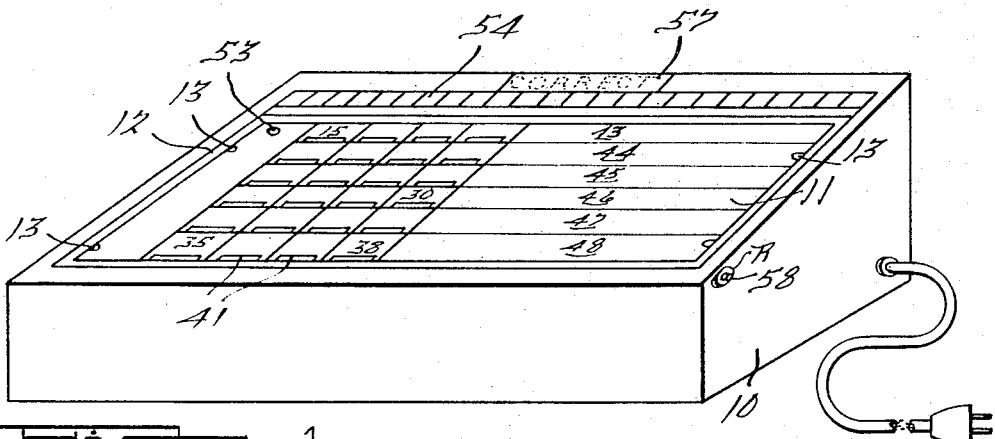
FIGURE 1 is a perspective view of an educational device for answering questions embodying features of the present invention.
Figure 2:
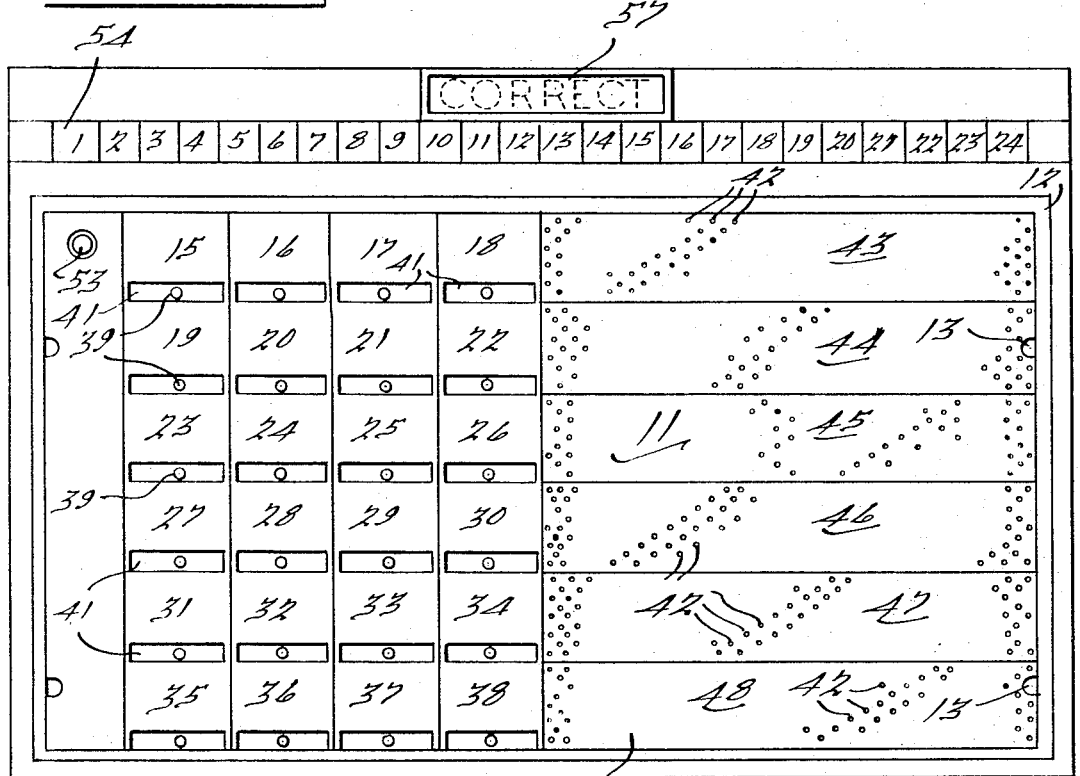
FIG. 2 is a plan view of the structure illustrated in FIG. 1.

Referring to the drawings, a case 10 has a sloping top 11 a border frame 12 supporting fingers 13 under which a card 14 may be secured. The left side of the top 11 is divided into 24 areas, 15 to 38, which may be considered question areas in which the problem to be solved will be located. Adjacent to the bottom of each of the areas 15 to 38, lamps 39 are suported in sockets in compartments 41 which may have reflecting surfaces to intensify the illumination. To the right of each series of 4 of the question areas 15 to 18, 19 to 22, 23 to 26, etc., contact areas 43, 44, 45, 46, 47 and 48 are provided, each having approximately 200 contacts 42, although a smaller or larger number may be employed. By using the large number of contacts, more locations are provided for the apertures in the card adjacent to each of the right and wrong answers provided thereon. Only a fraction of the large number of contacts will be made live through the connection of the different circuits 49, 51 and the like, to contacts in each of the areas 43 to 48, as clearly illustrated in FIG. 6. The contacts may be copper rivets secured in apertures in an insulating panel 52 which is used as the top 11 of the case 10. A lamp 53 at the top of the left hand edge of the case illuminates an area in the back of the card 14 illustrated in FIG. 9 containing the word "start" or the like, to indicate that the device is ready for operation. Along the upper edge of the case, 24 transparent areas 54 are provided bearing numerals 1 to 24 which correspond to the 24 question areas 15 to 38. If all of the selected answers for the questions in these areas are correctly selected by the use of a probe, all of the lamps 55 illustrated in the diagram of FIG. 3, will be illuminated seriatim and when the last question is answered correctly, lamp 24 will remain illuminated showing that a perfect score was obtained. As each of the lamps 55 of the series 54 are illuminated, lamps 56 in an adjacent compartment will be illuminated beneath a sign 57 thereover bearing the word "correct," providing a second and more brilliant display to appraise the operator of the correct answer. Other indicating means such as the flashing of light, ringing of a bell or the like, could also be employed in place of or in connection with the sign 57. The button of a switch 58 may be actuated by the operator at any time during answer period and at the end thereof to return all of the contacts of the electric circuits to their initial positions so that a new card can be placed upon the case top 11 in place of the old card and practice on other problems and subjects can be continued.

Referring to FIGS. 3, 4 and 5, devices 61 and 62 advance the conducting arms seriatim over contacts to set up the circuits. A conducting arm 63 advances over a series of contacts 64 in the device 61 while in the same device a conducting arm 65 is advanced over a plurality of contacts 66. Similarly, a conducting arm 67 is advanced over a series of contacts 68 in the device 62 when the correct answer is selected. A solenoid 69 actuates the device 61 and a solenoid 71 actuates the device 62 when the solenoids are energized. As illustrated in FIGS. 4 and 5, the armature of the solenoid 69 operates against an adjustable stop to advance one end of a rocket arm 72 which has a pivoted finger 73 on the other end biased toward a ratchet wheel 74 by a spring 75. Each time the solenoid 69 is energized, the rocker arm 72 is actuated to have the finger 73 engage a tooth 76 of the ratchet wheel 74 whereupon a spring 77 returning the armature of the solenoid to its initial position when deenergized, rocking the arm 72 in the opposite direction and advancing the ratchet wheel 74 the distance of the tooth.

A return solenoid 78 operates a pivoted arm 79 to remove a holding finger 81 from an engaged tooth and at the same time have an extending arm 82 engage a projecting finger 83 on the finger 73 to rock it from engagement with a tooth 76 so that a coil spring 84 can return the ratchet wheel 74 to its initial position which occurs upon the engagement of a stop pin 85 with a projecting finger 86. When in stop position, a projecting finger 87 engages a spring finger 88 to close the contacts thereof which is employed for lighting the lamp 53 to show that the device is in "start" position. A stop finger 89 limits the outward travel of the armature of the solenoid 78.

A probe 91 illustrated in FIG. 3 has a conducting rod 92 projecting therefrom urged outwardly by the bias of a spring 93. A contact 94 is engaged by the inner end of the rod 92 when the opposite end is moved into engagement with a contact 42 and pressed downwardly thereon. A power source 95, which is preferably a standard 115 volt circuit, is connected to a transformer 96 which reduces the voltage on the leads 97 and 98 of the circuit therefrom, the voltage of which may be any selected voltage which will not be harmful to a person in the order of 30 volts. Since 6 volt lamps are standard and a voltage from 30 to 60 volts is desirable for the solenoids, the different voltages can be obtained from the same transformer. The line 97 is connected to the contact 94 and the rod 92 is connected to a conductor 100 to have a circuit completed each time the rod is moved against the tension of the spring 93 to have it engage the contact 94. This will energize the solenoid 69 and advance the finger 63 to the next adjacent contact and the lamp 39 in the first question area 15 will be illuminated whether or not the correct answer was selected when engaging the end of the rod 92 with a contact 42. If the first question is correctly answered by the engagement of the correct contact 99 in the area 43, then the lead 97 will be connected to the No. 1 contact of the series 64 passing current through the line 101 to the solenoid 71 which actuates the device 62. This moves the finger 67 to the first contact No. 1 of the series 68 which is connected by a conductor 102 to the No. 1 lamp 55 of the answer series. The actuation of solenoid 71 operates the finger 103 which moves a contact arm 104 to break a circuit through a contact arm 105 and complete a circuit through a contact arm 106. The completion of the circuit through the contact arms 104 and 106 encircuits the lamps 56 and illuminates the sign having the word "correct" thereon so that the operator is further appraised of the fact that the correct answer was selected. The lamps 56 will be disconnected upon the return movement of the solenoid. This cycle of operation will continue the proper contact for the next succeeding questions is correctly selected. However, if one of the contacts 42 is not connected by a circuit which indicates the correct answer, then a circuit to one of the contacts in the series 66 will not be energized, the circuit 101 will remain deenergized as well as the solenoid 71 and the next light in the answer series 55 will not be iluminated nor will the word "correct" be flashed. The operator will thereby be charged with an incorrect answer, the correct number of answers scored will be indicated at all times by the number of the last light to be illuminated in the answer series. If all of the answers are correctly selected, the last lamp 55 of the answer series and the word "correct" will remain illuminated to show that all the answers were correctly selected. This occurs through the completion of the circuit to the lamps 55 and 56 through the engagement of the contact figures 104 and 105 at the time the finger 67 engages the contact 24 of the group 68. It will be seen that for each question one of the plurality of contacts in the answer area adjacent thereto, will indicate the correct answer and that a maze of wires, a few of which is shown in FIG. 6, will be required to interconnect the contacts which are to show the correct answers for each of the questions in each of the areas in which the answers to be sought. Different contacts can be used for answering different questions on different cards, as such energized contacts will be covered by the card and cannot be probed when answering questions on the card being employed. Similarly, the contacts used for a particular card will be covered when another card is employed. Sufficient blank contacts will remain which will appear opposite the probeable openings for incorrect answers and the large number of contacts makes the selection of circuits versatile for many different types of cards which can be furnished with the device.

The cards one of which is illustrated in FIG. 9 are unique in that they cover the entire area of the top 11 of the device and are translucent so that the indications in reverse on the back of the card will not be seen from the front but will appear in illuminated areas to show "start" and the correct answer under each of the questions. Transparent windows with opaque answers on the back can be employed for this purpose although the cards of a translucent material permit the indicia on the opposite side to be read therethrough.

In FIGS. 7 and 8, a card 14 is illustrated having question areas 15a, 16a, 17a and the like, up to 38a correspond to the areas 15 through 38 laid out on the case top 11. The areas 107 will correspond to the answer areas 39 and are illuminated to show the answers directly adjacent to the problem or question. A series of numbers 0 to 9, are scattered in the area 43a corresponding to the area 43 of the case top 11, having an aperture 108 adjacent to each of the numbers which uncover contacts 42, only one of which will be in a circuit to provide an indication for the right answer. Even though other contacts are in a circuit for the other answers in the areas, these circuits will be dead since the finger 65 is only engaging one contact of the series 66 which corresponds to the question which is to be answered next in the series. It will be noted in FIG. 8 that the answers are indicated on the back of the card in reverse order so that they will be in correct readable position when illuminated from the back and viewed from the front of the card.

Referring to FIGURES 9–12 another form of lesson card 111 is illustrated to teach children how to spell words of three letters such as "dog" in the three areas 15b, 16b and 17b. The picture of a "dog" is located in the question area 15b with sufficient space therebelow to have the letter D appear when the probe engages a contact when extended through an aperture 112. If this aperture is adjacent to the letter D in the answer area, not only will the lamp 39 in the area 15b be illuminated, but the first lamp 55 of the correct answer series and the word "correct" will be illuminated. Whether or not the correct contact was engaged for the answering, the device 61 will be operated to have the conducting arm 65 engage the second contact of the series 64 to set up the device for probing the next letter O. If the probe is extended through the aperture 114 adjacent to the letter O the lamp 39 in the question area 16b will be illuminated which will occur upon the engagement of any of the contacts in the answer area and since the letter O was selected and is the correct answer, the device 62 will be actuated to energize a circuit to illuminate the second lamp 55 in the answer series and the lamps 56 beneath the word "correct." The device 61 will have been actuated to advance the finger 65 to the third contact of the series 64 to set up the device for probing the third and last letter of the word "dog." Upon moving the contact of the probe into engagement with a contact in the answer area through an aperture in the card adjacent to the letter G or some other letter, the lamp 39 in the area 17b will be illuminated and all of the letters D O G will be visible through the card. If the letter G was correctly selected, the third lamp 55 of the answer series and the lamps 56 will also be illuminated.

The spelling of the words gun, fly, sun, bed, pig, cat and bat shown by pictures in the first question area of three area series covering the spelling of the three letter words will be attempted by the child being taught and when all of the letters of the words have been spelled, or attempted to be spelled, the number of correct answers will be shown by the number of lamps 55 of the answer series have been illuminated. If all of the answers are correct, then all of the lamps 55, as well as the word "correct" will remain illuminated until the switch 58 is operated to return the devices 61 and 62 to their beginning positions at which time only lamp illuminated will be the one at the "start" position. The lesson can then be repeated on the same card or on a new card placed on the top of the case in place thereof. The rear face of the card 111, illustrated in FIG. 10, shows the letters D and O and the other letters for the answers in reverse position so that they will appear in correct readable position on the front of the card when illuminated at the back thereof as illustrated on the dotted line in FIG. 9. The word "start" similarly will have its letters in reverse position and with this arrangement, the letters or answers are not visible on the front of the sheet until the question area is illuminated by a lamp 39.

A further form of card 117 is illustrated in FIG. 11 having windows 118 therethrough covered on the rear face by a transparent material 119 having the numbers, letters or words 121 on the rear face. The letters are made preferably from an opaque material so that they will be sharply visible from the front of the sheet when the rear face thereof is illuminated. It is to be understood that many cards can be made up bearing simple questions or problems for young children and more intricate questions and problems for older children and adults. For example, the picture of the United States could be placed in each of the question areas with answers set to provide the name of the capital of each of the states. Problems can be set up on cards for high school and college students to which the answers can be obtained by the use of the probe. Games embodying questions and answers can be formulated for a series of cards for entertainment purposes. One can readily see that a large number of cards can be made up for the device and it is for this reason that the 200 or more contacts are employed in each answer area.

What is claimed is:

1. In an educational device, a case, a top on said case having question and answer areas, a lesson card having mating question and answer areas securable on said top, said answer areas having answer apertures through the card with a correct and a plurality of wrong answers adjacent thereto, means indicating a correct answer, circuits to the question and answer areas and to the correct answer indicating means, a probe in the circuit with which an answer may be selected through an answer aperture through the card for completing a circuit if the proper contact is engaged by the probe to indicate a correct answer, and a second circuit through the probe indicating the correct answer in the question area to the problem on the card whether or not a circuit was completed which provided the correct answer.

2. In an educational device, a case having a top with question and answer areas to be covered by a lesson card containing questions each of which has a correct and a plurality of wrong answers with apertures provided through the card adjacent each answer, said top having illuminating means for an answer for each question, scoring means recording each correct answer, contacts in the answer area one of a plurality of which is in a circuit which indicates a correct answer on the scoring means, a probe insertable through one of a plurality of apertures through the card for answering the question, a circuit through the probe energized upon the engagement of any contact for completing a circuit to the answer illuminating means, the circuit through probe when engaging the correct answer contact, completing a circuit to the scoring means to show that the answer is correct and the number of the correct answers.

3. In an educational device, a case having a top with question and answer areas to be covered by a lesson card containing questions each of which has a correct and a plurality of wrong answers with apertures provided through the card adjacent each answer, said top having illuminating means for an answer for each question, scoring means recording each correct answer, contacts in the answer area one of a plurality of which is in a circuit which indicates a correct answer on the scoring means, a probe insertable through one of a plurality of apertures through the card for answering the question, a circuit through the probe energized upon the engagement of any contact for completing a circuit to the answer illuminating means, the circuit through probe when engaging the correct answer contact, completing a circuit to the scoring means to show that the answer is correct and the number of the correct answers and at the same time completing a circuit to an indicating means to further appraise the operator the question has been successfully answered.

4. In an educational device, a case, a top on said case having question and answering areas, means in said question areas for indicating the correct answer on a lesson card applied to the top of the case, said lesson card having question areas and associated answer areas which last areas contain one correct answer aperture and a plurality of wrong answer apertures, the answer area of the top adjacent to the question area containing a large number of contacts some of which are connected in circuits to indicate the correct answer and all of which are connected to circuits to indicate what the correct answer shall be, and a probe for engaging a selected contact through a selected aperture in the card for completing a circuit to said indicating means.

5. In an educational device, a case, a top on said case having question and answering areas, means in said question areas for indicating the correct answer on a lesson card applied to the top of the case, said lesson card having question areas and associated answer areas which last areas contain one correct answer aperture and a plurality of wrong answer apertures the answer area of the top adjacent to the question area containing a large number of contacts some of which are connected in circuits to indicate the correct answer and all of which are connected to circuits to indicate what the correct answer shall be, a probe for engaging a selected contact through a selected aperture in the card for completing a circuit to said indicating means, and means actuated when the proper contact has been selected to providing a permanent indication that the question had been successfully answered.

6. In an educational device, a case, a top on said case having question and answering areas, means in said question areas for indicating the correct answer on a lesson card applied to the top of the case, said lesson card having question areas and associated answer areas which last areas contain one correct answer aperture and a plurality of wrong answer apertures the answer area of the top adjacent to the question area containing a large number of contacts some of which are connected in circuits to indicate the correct answer and all of which are connected to circuits to indicate what the correct answer shall be, a probe for engaging a selected contact through a selected aperture in the card for completing a circuit to said indicating means, means actuated when the proper contact has been selected to providing a permanent indication that the question had been successfully answered, and a second means for indicating a correct answer actuated for a short length of time when the first correct answer indicating means is actuated.

7. In an educational device, a case, a top on said case having question and answering areas, means in said question areas for indicating the correct answer on a lesson card applied to the top of the case, said lesson card having question areas and associated answer areas which last areas contain one correct answer aperture and a plurality of wrong answer apertures the answer area of the top adjacent to the question area containing a large number of contacts some of which are connected in circuits to indicate the correct answer and all of which are connected to circuits to indicate what the correct answer shall be, a probe for engaging a selected contact through a selected aperture in the card for completing a circuit to said indicating means, and a first and second pulse device in said circuits for advancing fingers over contacts in the circuit seriatim, the first said device being actuated each time an answer contact has been engaged by the probe to move two fingers of a pair of series of contacts, moving one finger to the next question contact and the other to engage a contact to illuminate the answer whether or not the correct answer was indicated, when the correct answer to a question is selected a circuit to the second pulse device is energized to move its finger to the next contacts for indicating the correct answer.

8. In an educational device, a case, a top on said case having question and answering areas, means in said question areas for indicating the correct answer on a lesson card applied to the top of the case, said lesson card having question areas and associated answer areas which last areas contain one correct answer aperture and a plurality of wrong answer apertures the answer area of the top adjacent to the question area containing a large number of contacts some of which are connected in circuits to indicate the correct answer and all of which are connected to circuits to indicate what the correct answer shall be, a probe for engaging a selected contact through a selected aperture in the card for completing a circuit to said indicating means, a first and second pulse device in said circuits for advancing fingers over contacts in the circuit seriatim, the first said device being actuated each time an answer contact has been engaged by the probe to move two fingers of a pair of series of contacts, moving one finger to the next question contact and the other to engage a contact to illuminate the answer whether or not the correct answer was indicated, when the correct answer to a question is selected a circuit to the second pulse device is energized to move its finger to the next contacts for indicating the correct answer, and means operated when the second pulse device is actuated to also indicate the correct answer was selected.

9. In an educational device, a case, a top on said case having question and answering areas, means in said question areas for indicating the correct answer on a lesson card applied to the top of the case, said lesson card having question areas and associated answer areas which last areas contain one correct answer aperture and a plurality of wrong answer apertures the answer area of the top adjacent to the question area containing a large number of contacts some of which are connected in circuits to indicate the correct answer and all of which are connected to circuits to indicate what the correct answer shall be, a probe for engaging a selected contact through a selected aperture in the card for completing a circuit to said indicating means, a first and second pulse device in said circuits for advancing fingers over contacts in the circuit seriatim, the first said device being actuated each time an answer contact has been engaged by the probe to move two fingers of a pair of series of contacts, moving one finger to the next question contact and the other to engage a contact to illuminate the answer whether or not the correct answer was indicated, when the correct answer to a question is selected a circuit to the second pulse device is energized to move its finger to the next contacts for indicating the correct answer, and means for returning all of said contacts of the pulse devices to their initial position before or after all of the questions have been answered.

10. In an educational device, a case, a top on said case having question and answering areas, means in said question areas for indicating the correct answer on a lesson card applied to the top of the case, said lesson card having question areas and associated answer areas which last areas contain one correct answer aperture and a plurality of wrong answer apertures the answer area of the top adjacent to the question area containing a large number of contacts some of which are connected in circuits to indicate the correct answer and all of which are connected to circuits to indicate what the correct answer shall be, a probe for engaging a selected contact through a selected aperture in the card for completing a circuit to said indicating means, a first and second pulse device in said circuits for advancing fingers over contacts in the circuit seriatim, the first said device being actuated each time an answer contact has been engaged by the probe to move two fingers of a pair of series of contacts, moving one finger to the next question contact and the other to engage a contact to illuminate the answer whether or not the correct answer was indicated, when the correct answer to a question is selected a circuit to the second pulse device is energized to move its finger to the next contacts for indicating the correct answer, means for returning all of said contacts of the pulse devices to their initial position before or after all of the questions have been answered, and means for indicating to the operator that all of the contact fingers are in their initial positions with the questions ready to be answered.

11. A lesson card having a plurality of areas for questions to be answered, a correct and a plurality of wrong answers adjacent to each said area each said answer having an aperture through the card adjacent thereto through which a probe may be extended, and answers on the rear of said card adjacent to each question which will appear through the front thereof when the area is illuminated.

12. A lesson card containing questions and answers, the front side of the card having a plurality of areas containing question material to be answered and an area adjacent to each question area containing one correct and a plurality of wrong answers with apertures through the card adjacent to each answer through which a probe may extend, and reversely written answers on the back of the card adjacent to each question which, when illuminated from the rear, can be read from the front.

13. A lesson card containing questions and answers, the front side of the card having a plurality of areas containing question material to be answered and areas adjacent thereto containing one correct and a plurality of wrong answers with apertures through the card adjacent to each answer through which a probe may extend, reversely written answers on the back of the card adjacent to each question which, when illuminated from the rear, can be read from the front, and a start indication on said card which appraises the operator that the questions on the card are ready to be answered.

14. A lesson card containing questions and answers, the front side of the card having a plurality of areas containing question material to be answered and areas adjacent thereto containing one correct and a plurality of wrong answers with apertures through the card adjacent to each answer through which a probe may extend, windows through the card in the answer areas, and transparent material closing said windows having the answer thereon reversely disposed on the back thereof.

References Cited by the Examiner
UNITED STATES PATENTS

| | | | |
|---|---|---|---|
| 2,983,053 | 5/1961 | Bartholomew et al. | 35—9 |
| 3,100,352 | 8/1963 | Boissevain | 35—9 |
| 3,124,883 | 3/1964 | Kern | 35—9 |
| 3,154,862 | 11/1964 | Culpepper | 35—9 |

EUGENE R. CAPOZIO, *Primary Examiner.*

W. W. NIELSEN, *Assistant Examiner.*